G. W. & D. S. WEMPLE.
TIME REGISTERING EGG BOILING MACHINE.
APPLICATION FILED MAR. 13, 1913.

1,124,982.

Patented Jan. 12, 1915.
3 SHEETS—SHEET 1.

WITNESSES

INVENTORS
George W. Wemple
Daniel S. Wemple

G. W. & D. S. WEMPLE.
TIME REGISTERING EGG BOILING MACHINE.
APPLICATION FILED MAR. 13, 1913.

1,124,982.

Patented Jan. 12, 1915.

G. W. & D. S. WEMPLE.
TIME REGISTERING EGG BOILING MACHINE.
APPLICATION FILED MAR. 13, 1913.

1,124,982.

Patented Jan. 12, 1915.
3 SHEETS—SHEET 3.

WITNESSES
W. A. Ridgway
Jesse Van Valkenburg

INVENTORS
George W. Wemple
Daniel S. Wemple

UNITED STATES PATENT OFFICE.

GEORGE W. WEMPLE AND DANIEL S. WEMPLE, OF MINNEAPOLIS, MINNESOTA.

TIME-REGISTERING EGG-BOILING MACHINE.

1,124,982.  Specification of Letters Patent.  Patented Jan. 12, 1915.

Application filed March 13, 1913. Serial No. 754,156.

*To all whom it may concern:*

Be it known that we, GEORGE W. WEMPLE and DANIEL S. WEMPLE, being citizens of the United States, residing at Minneapolis, in the county of Hennepin and State of Minnesota, have invented a new and useful Time-Registering Egg-Boiling Machine, of which the following is a specification.

Our invention relates to improvements in time registering egg boiling machines, and has for its object to provide an egg boiling machine by which a large number of eggs can be boiled in the same boiler and for different lengths of time.

A further object is to provide means by which the boiling action can be stopped after the eggs have been removed from the boiler.

A further object is to provide means by which eggs that have been boiled different lengths of time can be distinguished.

In the past it has been difficult in large hotels or restaurants to boil a number of eggs at the same time without the liability of either under or over cooking some of the eggs.

Our device permits of a very large number of eggs being boiled at the same time and is absolutely automatic in its withdrawal of the eggs from the boiler at a predetermined time and the depositing of them in tepid water to stop the cooking action.

The full objects and advantages of our invention will appear in connection with the detailed description thereof and are particularly pointed out in the claims.

Figure 1:
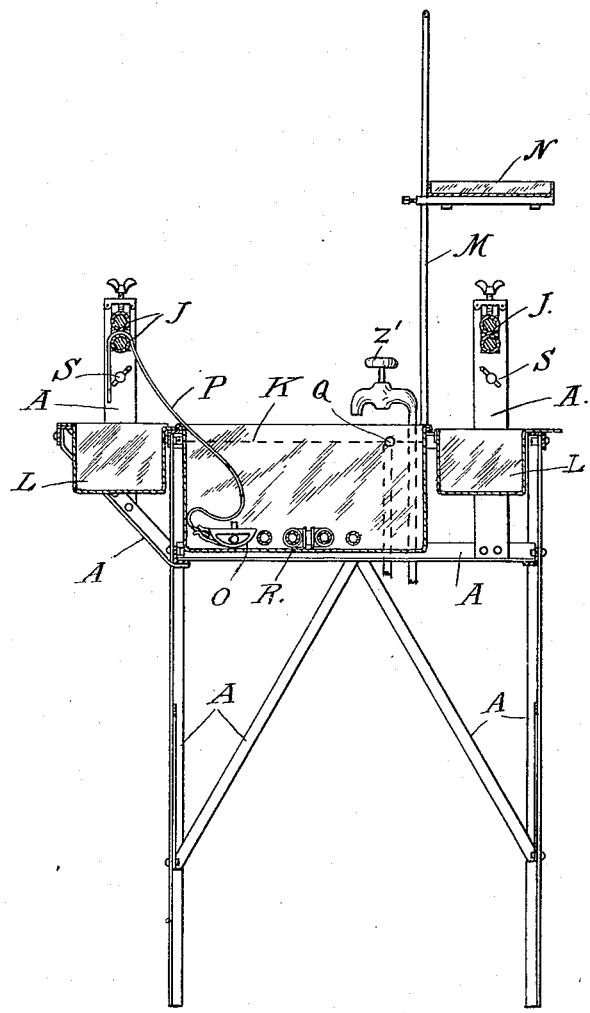
Figure 2:
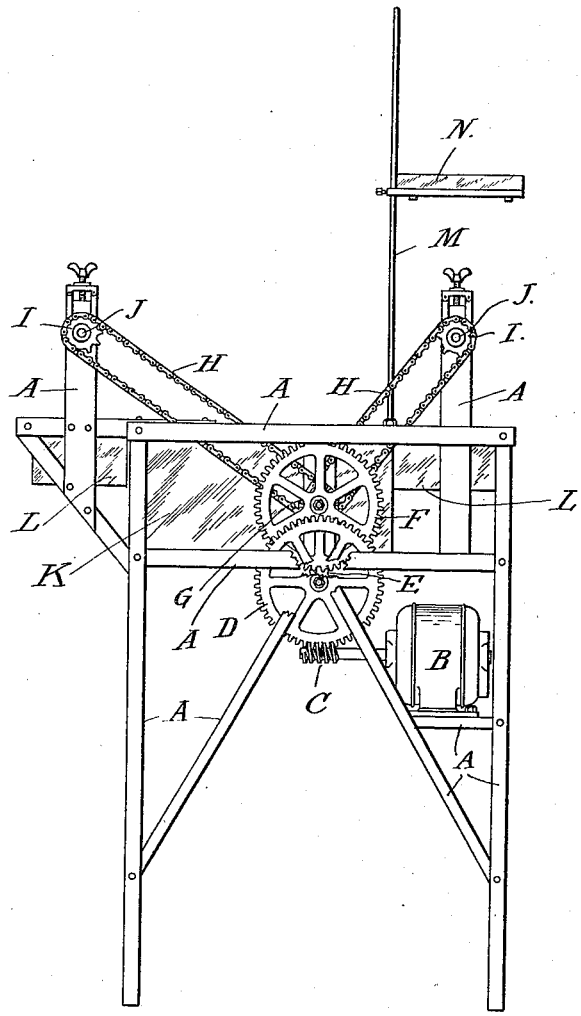
Figure 3:
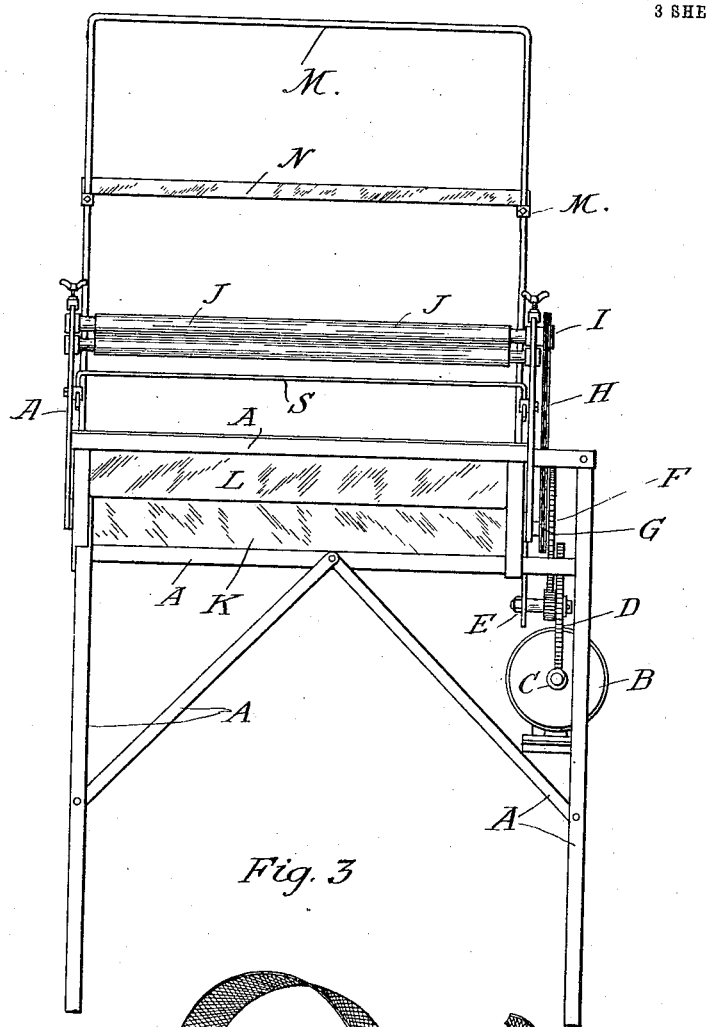
Figure 4:
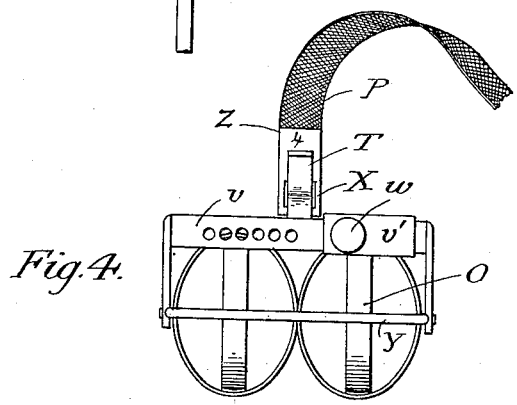
Figure 5:
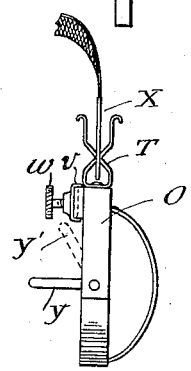

In the drawings, illustrating the application of our invention in one form,—Figure 1 is a vertical cross section of our invention. Fig. 2 is an end view. Fig. 3 is a side elevation. Figs. 4 and 5 are detail views of the construction of the egg holder and tape.

Our improved egg boiling machine in its preferred form comprises a frame A A to which may be attached an electric motor B or any desired form of power.

A worm gear C is driven by motor B and acts through a series of speed reducing gear wheels D, E, F, G, as best shown in Fig. 2.

Gear wheels G operate to drive chains H which in turn operate the gears I which are mounted upon the rollers J. The entire object of this mechanism is to gear down the speed of the power plant B so that the rollers J will be driven steadily at a comparatively slow rate.

Mounted upon the frame A A is a boiler receptacle K and on each side of boiler K is mounted another and preferably smaller receptacle L L for containing tepid water.

Mounted upon the top of frame A A is a bracket frame M M to which is attached a pan shelf N for the purpose of holding the tape and egg holders when not in use. The egg holder or cartouche O is shown in Fig. 1 as it will appear when at the bottom of the boiler K in operative connection.

Connecting egg holder O to the pair of rollers J is a tape P.

An overflow pipe Q is provided near the top of the boiler receptacle K so that the water will not go over a certain level.

The steam coils R are provided for the purpose of heating the boiling mechanism, but any available form of heat can of course be used.

Attached to the frame A A just below the rollers J is a rod S which has for its object the detaching of the egg holders O from the tape P when the eggs have been withdrawn from the boiler K. This permits the egg holder to fall into the tepid water receptacle which is mounted directly beneath the pair of rollers.

The egg holder O consists of a skeleton framework to which is attached the spring clip T which clasps the end of the tape P which is armed at both ends with a metal piece X X. The metal piece is provided with a hole through it to permit the spring to clamp into it when the tape is inserted. The part $v$ of the egg holder O is provided with a row of holes by any one of which the sliding piece $v'$ may be held by means of a set screw W for the purpose of covering the holes. The number of the holes uncovered corresponds with the numbers or figures on the tape and designates the number of minutes or time the eggs have been boiled. A wire or metal guard $y$ is hinged to the frame O which, when swung to Y', admits the egg into the egg holder O and when swung back at right angles to the frame O prevents the eggs from falling out. On tape P is placed a number Z which designates the minutes or time the tape will permit the eggs to be boiled when it has been inserted in the rolls in the usual manner. Z' is a drip cock which is attached to a hot water tank and has for its purpose to keep the water up to a certain height, the top of the overflow pipe.

In operation the eggs to be boiled are placed in the egg holder to which is attached a proper tape of a certain length. The egg holder holding the eggs is dropped into the tank holding the water with the free end of the tape inserted between either pair of rollers, which rollers are driven at a given speed by means of the motive power. The rollers pull the tape and the egg holder from the boiling water in a given time according to the length of the tape. As the egg holder leaves the boiling water at the edge of the tank it is drawn up to the detaching rod S which opens the spring clasp or clamp T and permits the egg holder to drop into the tank of tepid water which is provided for the purpose of stopping the cooking action, the water acting also as a cushion to prevent the eggs from breaking when the egg holder drops off the tape. An adjustable registering device is provided on the egg holder which is set to correspond with the number on the tape and enables the cook to determine how long the eggs in any certain egg holder have been boiled after it has been detached from the tape and mixed in the handling.

The utility of this device where a large number of people is to be served is obvious. The action of our invention is automatic after the tape has been inserted between the rollers, and hence the eggs receive the exact length of time in boiling that is required in any given case, and the boiling action is then stopped. There is nothing complicated or easily worn out about our device, and it is comparatively inexpensive to construct.

We claim:

1. A machine for boiling eggs comprising a boiler receptacle, a tepid water receptacle, means removable from the machine for holding the eggs, means acting upon said holding means for withdrawing the eggs automatically from the boiler, and means to automatically detach said holding means from said withdrawing means and permit said holding means to drop into the tepid water receptacle.

2. A machine for boiling eggs comprising a boiler receptacle, a detachable egg holder, a tape removably attached to said egg holder, the length of said tape determining the time the eggs are to be boiled, a pair of rollers adjacent the boiler receptacle between which rollers the tape is moved to withdraw the egg holder from the boiler after the expiration of the determined time, and means for actuating the rollers.

3. A machine for boiling eggs comprising a boiler receptacle, a tepid water receptacle, a plurality of egg holders, a plurality of tapes removably attached to said egg holders, each tape being of a length determined by the time the eggs are to be boiled, a pair of rollers adjacent the boiler receptacle between which rollers the tapes are simultaneously moved to withdraw the egg holders from the boiler after the expiration of the determined time, means for actuating the rollers at a constant speed, and a rod adjacent said pair of rollers to detach the egg holders from the tapes and permit the egg holders to fall into the tepid water.

4. A machine for boiling eggs comprising a boiler receptacle, a plurality of tepid water receptacles, a plurality of egg holders, a plurality of tapes removably attached to said egg holders, a plurality of pairs of rollers adjacent the boiler receptacle, a rod adjacent each pair of rollers to detach the egg holders from the tapes and permit the egg holders to fall into the tepid water, and means for actuating the rollers at a constant speed.

5. In an egg boiling machine, the combination of a tape provided at its end with a metal tip having an opening therein, an egg holder, and an attaching clip on said holder, said clip comprising a pair of opposed resilient jaws having elbows that take into said opening thereby engaging the clip and tape.

In testimony whereof, we have signed our names to this specification, in the presence of two subscribing witnesses, on this sixth day of March, A. D. 1913.

GEORGE W. WEMPLE.
DANIEL S. WEMPLE.

Witnesses:
W. A. RIDGWAY,
JESSE VAN VALKENBURG.

Copies of this patent may be obtained for five cents each, by addressing the "Commissioner of Patents, Washington, D. C."